US009232338B1

(12) United States Patent
Henry et al.

(10) Patent No.: US 9,232,338 B1
(45) Date of Patent: Jan. 5, 2016

(54) SERVER-PAID INTERNET ACCESS SERVICE

(75) Inventors: Paul Henry, Holmdel, NJ (US); Hui Luo, Marlboro, NJ (US)

(73) Assignee: AT&T INTELLECTUAL PROPERTY II, L.P., Atlanta, GA (US)

(*) Notice: Subject to any disclaimer, the term of this patent is extended or adjusted under 35 U.S.C. 154(b) by 2128 days.

(21) Appl. No.: 11/214,072

(22) Filed: Aug. 29, 2005

Related U.S. Application Data

(60) Provisional application No. 60/608,454, filed on Sep. 9, 2004.

(51) Int. Cl.
*H04W 4/00* (2009.01)

(52) U.S. Cl.
CPC .................................... *H04W 4/00* (2013.01)

(58) Field of Classification Search
None
See application file for complete search history.

(56) References Cited

U.S. PATENT DOCUMENTS 5,668,876 A 9/1997 Falk et al.
5,970,477 A * 10/1999 Roden .................. 705/32
6,108,790 A 8/2000 Moriya et al.
6,181,690 B1 * 1/2001 Civanlar .................. 370/352
6,233,618 B1 5/2001 Shannon
6,327,254 B1 * 12/2001 Chuah .................. 370/328
6,539,482 B1 3/2003 Blanco et al.
6,615,352 B2 9/2003 Terao et al.
6,711,682 B1 3/2004 Capps
6,760,757 B1 * 7/2004 Lundberg et al. .................. 709/217
6,845,230 B2 * 1/2005 Syed .................. 455/3.02
6,845,453 B2 1/2005 Scheidt
6,862,444 B2 * 3/2005 Karaoguz et al. .................. 455/408
6,912,642 B2 * 6/2005 Nishikawa .................. 711/171
6,918,035 B1 7/2005 Patel
7,206,318 B2 * 4/2007 Keller .................. 370/433
7,334,022 B2 * 2/2008 Nishimura et al. .................. 709/208
7,366,149 B2 * 4/2008 Maki et al. .................. 370/338
7,506,054 B1 * 3/2009 Fuh et al. .................. 709/225
7,813,822 B1 * 10/2010 Hoffberg .................. 700/94
2002/0087335 A1 * 7/2002 Meyers et al. .................. 705/1
2002/0184304 A1 * 12/2002 Meade et al. .................. 709/203
2002/0199203 A1 * 12/2002 Duffy .................. H04L 29/06027 725/109
2003/0027554 A1 * 2/2003 Haumont .................. 455/414
2003/0069788 A1 * 4/2003 Han .................. 705/14
2003/0139180 A1 * 7/2003 McIntosh .................. H04L 63/0853 455/426.1
2004/0066782 A1 * 4/2004 Nassar .................. 370/389
2005/0044197 A1 * 2/2005 Lai .................. 709/223
2005/0063369 A1 * 3/2005 Choudhury et al. .................. 370/360
2005/0066166 A1 * 3/2005 Chin et al. .................. 713/165
2005/0088999 A1 * 4/2005 Waylett et al. .................. 370/338
2005/0210288 A1 * 9/2005 Grosse .................. 713/201
2005/0223111 A1 * 10/2005 Bhandaru et al. .................. 709/236
2005/0286466 A1 * 12/2005 Tagg et al. .................. 370/329
2006/0143702 A1 * 6/2006 Hisada et al. .................. 726/15
2007/0112948 A1 * 5/2007 Uhlik .................. H04L 12/14 709/223

* cited by examiner

*Primary Examiner* — Bruce I Ebersman
(74) *Attorney, Agent, or Firm* — Hanley, Flight & Zimmerman, LLC

(57) ABSTRACT

An embodiment of a system for providing Internet access free of charge to a user utilizes an Internet service provider for connecting a user to the Internet, a zone creation means, and a zone organizer. Free zones of servers are created, wherein the free zones are groups of at least one server to which at least one user can connect. The zone organizer can be in communication with the ISP. The zone organizer can be a traffic monitor, a traffic controller, an authentication protocol, a bookkeeping protocol, a fee collection and dispersal module, and/or an indexing and listing function.

18 Claims, 1 Drawing Sheet

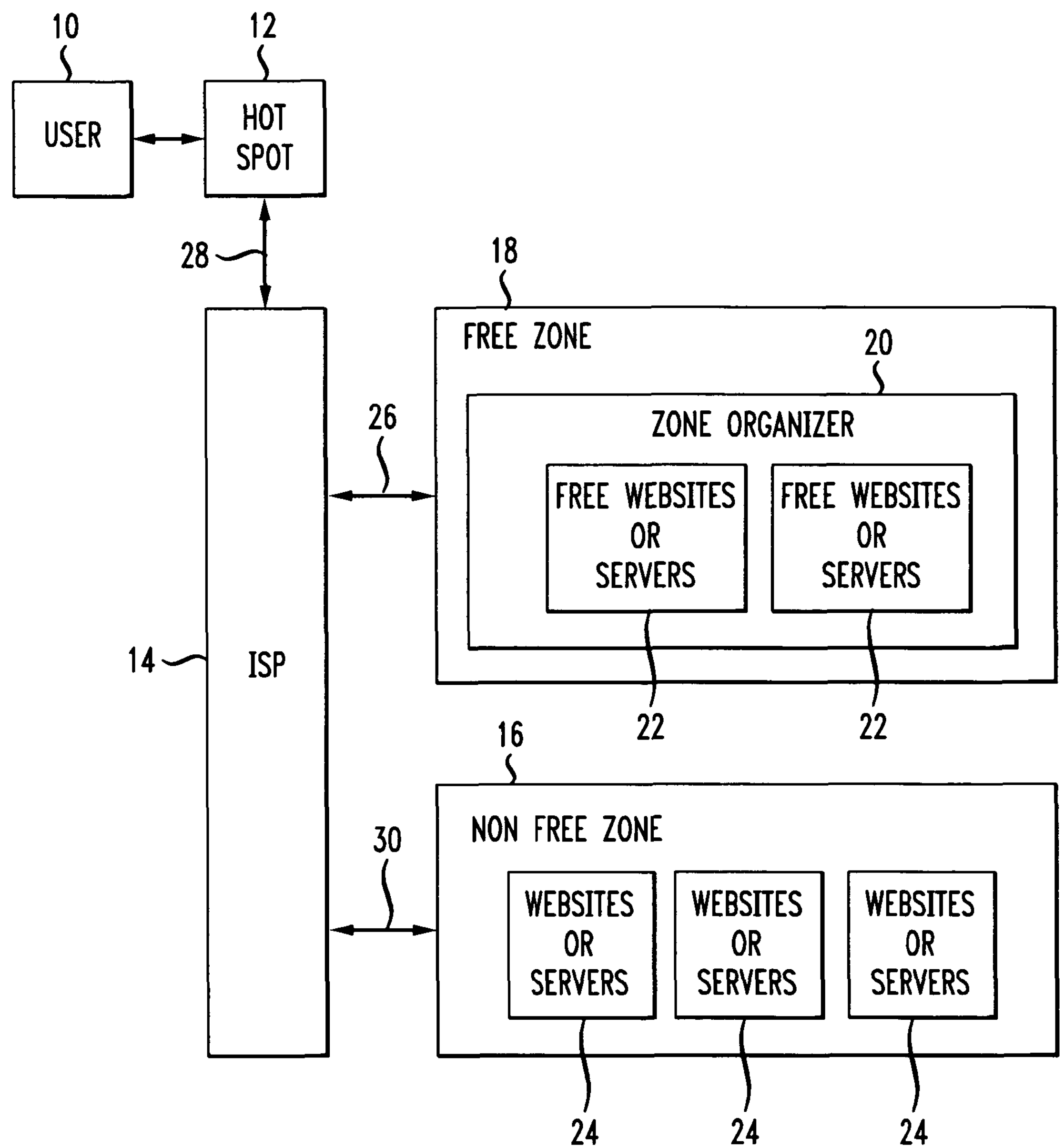
10
12
USER
HOT SPOT
28
18
FREE ZONE
20
ZONE ORGANIZER
26
FREE WEBSITES OR SERVERS
FREE WEBSITES OR SERVERS
14
ISP
22
22
16
NON FREE ZONE
30
WEBSITES OR SERVERS
WEBSITES OR SERVERS
WEBSITES OR SERVERS
24
24
24

SERVER-PAID INTERNET ACCESS SERVICE

CROSS REFERENCE TO RELATED APPLICATIONS

The present application claims priority to U.S. Provisional Patent Application Ser. No. 60/608,454 filed on Sep. 9, 2004.

FIELD

The present embodiments relate generally to methods usable by Internet service providers (ISP) to offer free zone Internet services and paid Internet services.

BACKGROUND

Hotspot Wi-Fi Internet service has been touted for years, but so far revenue remains modest, partially because users and their employers hesitate to pay for just occasional needs at a limited number of hotspots. However, most users agree they need Internet service while they are on the road for a variety of reasons. The embodiments herein solve this problem by enabling some special servers to pay for the Wi-Fi access, so the access is free to users. Examples of such servers include real-time information servers such as Web servers offering airline schedules, travel-related Web servers such as those for travel reservation, direction, and local information, and business servers such as VoIP gateways, VPN gateways, and email servers. The embodiments can also be applied to other types of public Internet services.

SUMMARY

The present embodiments for systems and methods for providing Internet access free of charge to a user utilize an Internet service provider (ISP) for connecting a user to the Internet, a zone creation means, and a zone organizer. The zone creation means can create free zones of servers, wherein the free zones are groups of at least one server to which at least one user can connect.

The zone organizer can be in communication with the ISP. The zone organizer can include a traffic monitor, a traffic controller, an authentication protocol, a bookkeeping protocol, a fee collection and dispersal module, and an indexing and listing function.

The traffic monitor can track connections from users to the servers in the free zones. The traffic controller can monitor and control traffic to servers in the free zones. The authentication protocol can be used to verify the user. The bookkeeping protocol can be for tracking fees charged by the ISP to the servers of the free zones. The fee collection and dispersal module can be for fees charged to the servers of the free zones and paid to the ISP. The traffic monitor can provide indexing and listing functions for servers of the free zone.

BRIEF DESCRIPTION OF THE DRAWINGS

The detailed description will be better understood in conjunction with the accompanying drawings as follows:

FIG. 1 depicts an embodiment of a system for providing Internet access free of charge to a user.

The present embodiments are detailed below with reference to the listed Figure.

DETAILED DESCRIPTION OF THE EMBODIMENTS

Before explaining the present embodiments in detail, it is to be understood that the embodiments are not limited to the particular embodiments and that they can be practiced or carried out in various ways.

The present embodiments relate to a new service concept that utilizes server paid Internet access and a system that supports that service. The embodiments relate to methods for Internet service providers (hereafter termed "ISP"), such as a hotspot Wi-Fi service provider, to offer free zone Internet services that are free to users, but the costs are paid by operators of the servers, or perhaps by a third party.

A free zone is defined as a set of servers or IP addresses to which a user requesting access is permitted fee-free access. The owner of the server can be charged for connecting to the server. The owner of the server can be charged the entire amount or a portion of the connection charge for connecting the user into the internet.

Authentication of the user connecting to the site can be used. For example, when a third party desires the use of an AT&T data site for research data, the user can be authenticated so that only authorized third parties have free use. Creation of a free zone can be used by employees of a company, in order to ensure that the employees do not have to pay a fee for connecting to the server, either by Wi-Fi or remotely through facilities that are facilities not owned by the company (for example, in an airport, at a taxi stand, in a department store, or in a restaurant).

The present embodiments address the above-described industry need by proposing an arrangement where selected servers agree to pay the access charges to allow the hot-spot to be free for the users. Examples of selected servers can include real-time information servers (such as, Web servers offering airline schedules), travel-related Web servers (such as, those for travel reservations, directions and location information), and business servers (such as, voice over Internet protocol (VoIP) gateways, virtual private network (VPN) gateways, and email servers). The embodiments can be applied to other types of public Internet services, such as financial services for real-time market information.

The server-paid Internet access service can be initiated by a user connecting his communication device to a hot-spot Wi-Fi access point that is open to the public, whereby the user then receives an IP address. Wi-Fi stands for Wireless Fidelity, an industry name for 802.11 wireless technology. The user can launch a Web browser and a Web page can be automatically returned to the user. The Web page allows the user to choose whether to pay for the Internet access with complete freedom to use the Internet, or whether to access to a limited set of servers on the Internet, defined as a "free zone", for free or for discounted charge. A hot-spot Wi-Fi network can offer one or multiple "free zones", with different brands, depending on the business position of the hot-spot service provider. If the user chooses to pay, conventional hot-spot Wi-Fi access procedures are employed and the user can access the entire internet. If the user chooses to access a free zone, a Web page containing a list of servers in the free zone can be shown to the user. The list can be indexed in multiple ways.

For example, the listing can be based on business categories, geographic distance, or any other category. A search engine can allow the user to locate quickly one server or a group of servers. Some servers, especially business servers known only to exclusive users, may not be shown on the list or searched, thereby allowing the user to access these sites only by knowing and using specific URLs. A user can select a particular free zone server and receive a Web page that shows the allowed user group, the allowed IP address range with which the user can communicate, the allowed IP packet type, and other applicable information as specified by the free zone server. If the free zone server earns advertising money, the free zone server may allow access to any user. If the server is a corporate server, the free zone server can restrict access to employees and accept secure traffic.

If a security system is used by the Wi-Fi network, a user can use a wild-card username and password to connect to a hotspot Wi-Fi network. If a user whose company has a server in a free zone is eligible to access the company's server, the user can be authenticated to the hotspot Wi-Fi access network using security protocols, provided that the hotspot Wi-Fi service provider's server will proxy the authentication request or response to the company's server. In this case, the user can be limited to access the company's server only.

A server can prompt for the server-paid authentication or the user can immediately begin to access the server. In one embodiment, the server can ask for authentication, wherein the user is validated or restricted. A window can pop up showing the connection time, the traffic volume, and a "disconnect" button. An access controller (a special router) in the hot-spot Wi-Fi network (or in the free zone network) can block any traffic that is not allowed by the server. The access controller can meter the traffic volume and connection time, which can be used to generate the billing statement to the server or other payer.

A zone organizer can be an entity that executes a program on a computer readable medium to act as a fee service in order to charge server owners all or a portion of any fee that might be levied to establish a connection between a user and the Internet.

The zone organizer can be adapted to manage and perform authentication activities. A zone organizer can present a user with an interface permitting a user to indicate which zone the user desires to connect with. The zone organizer can establish the authenticity of the user by any number of authentication protocols. For example, authentication protocols can include requesting a password from the user or requesting a biometric reading from the user, such as a thumbprint or a voice print.

The zone organizer can provide traffic monitoring to servers participating in the zones. The zone organizer can manage fees using fixed fees, wherein the fees are based on numbers of user or based on connect time. The zone organizer can act as a bookkeeper for the charges to access the servers by the user.

The zone organizer can act as a controller to send information to the ISP. The ISP, in turn, can control access to certain websites or servers based on the destination address for packets sent by the user, for example.

The zone organizer can provide an indexing and listing function to enable a user to select websites or servers to which access is desired.

A website or server can deliver .html documents, .pdf documents, .xml documents, and can be a node on the Internet, a LAN connection, or any other service with an IP address.

The term "free of charge" as used herein refers not only to providing a service without a fee, but also to a discounted fee, in which less than the actual charge posted or actual charge to provide the ISP service is incurred by the user.

An ISP can be an Internet service provider that provides access to the Internet for a user. The ISP can have a subscription service for members to provide user-paid Internet access. An ISP can offer a free service to the user akin to the toll free number service, wherein the service is free to individual phone callers whereby users are permitted access to selected zones for a fee which is charged to another party, not the user. For example, the charge can be incurred by the owner of the server or a marketing company which is marketing a group of websites.

An ISP can offer indexing and listing functions for a user to locate one or more free zones that are available for selection by a user.

The present embodiments contemplate that the ISP responds to the free zone organizer's instructions to implement access restrictions—access control by the ISP—for certain users requesting access for certain Web pages. As an example, a free zone can allow access by AT&T employees to AT&T work related sites, but can stop access by these employees to other companies' work related sites. An embodiment can be that all sites are blocked to the user, except for a group of allowed sites for fee generation purposes.

In one embodiment, each free zone can have a server, or multiple free zones can be managed by a single server. A server in a free zone can be hidden, wherein the server can only be located if the user knows the exact URL address.

The present embodiments contemplate that servers usable in the free zone or zones, have a set of access controls. Examples of access control include traffic type, allowed traffic destination, allowed user group, the use of user authentication, and combinations thereof. An example of traffic type can be, for example, Web traffic or an ftp download. An example of allowed traffic destination can be a website permitted in a free zone.

The present embodiments contemplate that the ISP, the user and the zone organizer can conduct a three party user authentication in which the user submits credentials that remain secret to the ISP. The server validates the three party user authentication and provides the authentication result to the access controller. For example, the user submits an encrypted password to the zone organizer who compares the password with the database of passwords. If a match exists, the zone organizer notifies the ISP of a successful authentication of the user; the user has not revealed the encrypted password to the ISP, thereby enhancing the privacy for the user and keeping theft occurring at an ISP to a minimum.

The present embodiments contemplate that both the ISP and the server can meter and log the traffic and the connect time to the websites or servers. The ISP and the server can report the demand and usage in order to bill the owner of the server.

With reference to the figure, FIG. 1 depicts an embodiment of a system for providing Internet access free of charge to a user. A user 10 can connect to a Hot Spot 12. The Hot Spot 12 can be connected 28 to an ISP 14. The ISP can be connected to a free zone 18 and a non-free zone 16. The non-free zone 16 can include the entire Internet not included in the free zone 18. A website or server can simultaneously be in both the free and non-free zones. For example, a website or server in both the free and non-free zones is a website that "privileged" users can reach for free, but others are required to pay a fee.

The free zone 18 includes free websites or servers 22 that have made agreements with the zone organizer 20 to allow access by users with necessary credentials from a Hot Spot 12 and in return the free websites or servers 22 make payments to the zone organizer or the ISP 14 for allowing a user 10 to access the free websites 22 without paying a fee. Thus, the connection 26 and 28 is a free connection. The connections 28 and 30 allow a user 10 to connect to websites or servers 24 that are not affiliated with the zone organizer 20. Thus, a user 10 can pay the Hot Spot 12 or the ISP 14 to establish a connection 30 or the user 10 can access the free websites or servers 22 without paying.

The following example scenario describes embodiments of the methods and the systems. The following example can be used to illustrate (1) a hotspot Wi-Fi service provider as a free zone organizer; and (2) a hotspot Wi-Fi service provider working with multiple free zone organizers The following assumptions can be made for example scenario: (1) the hotspot Wi-Fi network has not activated a security system, such as Wired Equivalent Privacy (WEP), and can rely on browser-based user authentication; (2) the server in the free zone can ask for server-paid user authentication; and (3) the owner of the server can be charged based on traffic volume and/or connection time.

EXAMPLE SCENARIO

In this example, only two networks are addressed: 1. a hotspot Wi-Fi network comprising one or more Wi-Fi access points, a DHCP server, a DNS server, a Web server (called a Web server A hereafter), a Radius server (called a Radius server A hereafter), and a programmable access controller (called the access controller A hereafter); and 2. a network hosting a free-zone server comprising the free zone server, a Web server (called a Web server B hereafter), and a Radius server (called a Radius server B hereafter). These two networks are separated by the Internet.

The functions of the components in the hotspot Wi-Fi network are briefly described below.

The Web server A can serve as the portal for the hotspot Wi-Fi network. Any HTTP request of any user who has not been authenticated for user-paid access and has not indicated a desire to access the free zone will be redirected to the Web server A's portal page. The Web server A can provide a user interface for browser-based user authentication and supportive functions for server-paid user authentication. Web server A can maintain a list of access control profiles, one for each free zone server. A free zone server's access control profile contains a URL pointing to the portal page for the free zone server. Since the free zone is hosted on the hotspot Wi-Fi network, the portal page is stored on the Web server A. The free zone server's access control profile further contains the allowed IP address range (a null value means the IP address will be assigned by the free zone server), and the allowed IP packet type (a null value means the IP address will be assigned by the free zone server). The free zone server's access control profile further contains a URL (called a server-paid authentication URL hereafter) pointing to the server-paid user authentication program employed by the free zone server. The URL is null if a server-paid user authentication is not used. The union of the allowed IP address ranges and the allowed IP packet types of all free zone servers that do not demand server-paid user authentication is called the absolute free zone. A user who has indicated to go to a free zone can access it.

The Radius server A can provide WPA-based user authentication and the back end operation of browser-based user authentication.

The access controller A can be a programmable firewall router. The access controller A connects all hotspot Wi-Fi access points to the Internet. The access controller A can maintain a list of access control records, each for a user connecting with a Wi-Fi access point. Every user can be identified by an IP address and MAC address. A user's access control record specifies the allowed IP address range, the allowed IP packet types, the allowed access time, and other applicable information such as the allowed bandwidth and the maximum number of sessions. If a user has not been authenticated for user-paid access and has not indicated a desire to access the free zone, the user is only allowed to access the DHCP server, the DNS server, and the Web server A for a short amount of time. If a user has been authenticated for user-paid access, the user can access the Internet without restriction. If a user has chosen to go to the free zone, the user can access the absolute free zone immediately. If a user has chosen a free zone server that demands a server-paid user authentication and if the user has not performed it yet, the user can only access the absolute free zone and the server-paid authentication URL for a short period. If a user passes the server-paid user authentication, the access range of the user is specified in the server's access control profile. Note that the access range can be narrowed down significantly by the server for a variety of reasons, such as security and competition prevention.

The following example procedure depicts how a user can access the server in the free zone with access controlled and paid by the server. The following example steps depict an example embodiment of a system and method that is especially resistant to hacker attack. The following example is an illustrative approach to implementing server-paid access a. The user's laptop/PDA associates with a hotspot Wi-Fi access point and obtains an IP address from the hotspot Wi-Fi network by running DHCP.
b. The user launches a Web browser and the browser issues an HTTP request to a Web server that is configured to supply the first page when the browser is launched.
c. When the IP packets carrying the HTTP request arrive at the access controller A, the access controller checks the access control record for the source IP address and the source MAC address and finds that the user has not indicated his intention (pay or go to free zone). Controller A replaces the destination IP address with that of the Web server A, in other words the user can only access Web server A, which is the portal of the hotspot Wi-Fi network.
d. Web server A sends back an HTTP response that redirects the user's browser to Web server A's portal page over Secure Socket Layer (SSL). SSL is a transport-layer security mechanism that is separate and distinct from WEP, which operates at the access layer.
e. The user's browser can send another HTTP request to retrieve Web server A's portal page per the redirecting instruction.
f. Web server A returns an HTTP response that contains the portal page. The portal page prompts the user to choose either to pay for the access or go to the free zone. For this example, the assumption is made that the user chooses to go to the free zone and submits the choice to Web server A.
g. Web server A can return a page containing a list of servers in the free zone, a search engine, and a URL input box for the user to identify the server he/she wants to access. The information associated with each server in the free zone includes the allowed traffic type (for example, TCP/UDP port numbers), the allowed IP address space that the user can communicate with, and whether a server-paid user authentication enforced by the hotspot Wi-Fi network is used. For this example, the assumption is made that the user selects a server that uses a server-paid user authentication and submits the choice to Web server A.
h. Web server A can check the free zone server's access control profile and assemble a URL (called a URL B hereafter) pointing to the authentication program running on the SSL port of Web server B. The URL B can contain another URL (called a URL A hereafter) as a parameter that points to the server-paid authentication assistant program running on the SSL port of Web server A. Web server A instructs the access controller A not to block the SSL traffic between the user and Web server B for a short period (for example, one minute), then sends back an HTTP response to redirect the user's browser to the URL B.

i. The user's browser sends an HTTP request to Web server B to retrieve information provided by the URL B per the redirecting instruction. When the IP packets carrying the HTTP request arrive at the access controller A, the IP packets are not blocked due to the instruction given in Step (h). Web server B assembles an HTML form that uses the URL A as the j. submission location. The form can include two input boxes, two hidden variables, and a "submit" button. The two input boxes can be used by the user to enter his/her username and password (or other type of user authentication credentials, but assuming a username/password hereafter). The two hidden variables can be a session ID and a one-time encryption key K, both generated by Web server B. The "submit" button can be associated with a JavaScript code. Web server B saves the session ID, the URL A that can identify the hotspot Wi-Fi service provider, and the key K in its temporary storage for near future use. The key can be removed right after the upcoming authentication request is processed or after they have expired. Web server B can then send back a login page containing this form to the user's browser.

k. The user would have no problem to trust this login page, because the login page is securely downloaded from the server that hosts the user's account. Note that the SSL channel is between the user's browser and Web server B, so no one, including the hotspot Wi-Fi service provider, knows the key K. The user can enter the username/password in the form and click on the submit button, which triggers the JavaScript code to do the following: (1) encrypts the username and password using the key K; (2) assigns null value to the hidden variable of the encryption key K; and (3) submits the session ID and the encrypted username and password to the Web server A's authentication program identified by the URL A.

l. Web server A can insert a nonce N and forward the session ID and the encrypted username and password in an HTTP request the Web server B over. SSL.

m. Based on the session ID and the URL A, Web server B retrieves the one-time encryption key K from the temporary storage. The encryption key decrypts the username and password, checks them against the Radius server B, and sends a positive or negative acknowledgement page in an HTTP response to Web server A. The encryption key can optionally embed the user traffic restriction information in a positive response, such as the allowed IP address range, the allowed IP packet types, the allowed access time, and the like. Regardless of the authentication result, Web server B permanently deletes the one-time encryption key K in order to prevent replay attacks. In addition, the Web server can log the session ID, the nonce N, the URL A, the username, the authentication time, and the authentication result in a permanent storage, and use them as an audit record against the hotspot Wi-Fi server provider's billing record. The hotspot Wi-Fi service provider might intend to admit users who fail the authentication in order to overcharge the server. The above authentication procedure can prevent this problem. The knowledge of the nonce N can empower Web server B to disconnect the user by sending a "disconnect" request to Web server A.

n. Web server A can forward the acknowledgement page to the user's browser. If the authentication succeeds, the Web server A instructs the access controller A to route the user's traffic based on the user traffic restrictions given in the response or specified in the free zone server's access control profile, and starts to meter the usage that is identified by the session ID and the URL B. The Web server can insert some instructions in the acknowledgement page such that a small window can pop up on the user's screen, which contains an HTML form comprising a "disconnect" button and two hidden variables (the session ID and the nonce N). If the authentication fails and if retry is allowed, Web server A includes the URL B in the acknowledgement page. If the authentication fails and if retry is not allowed, it can include the URL pointing to Web server A's welcome page.

o. For this example, the assumption is made that the authentication succeeds. The user can communicate with the server and any IP address allowed by the server using any allowed TCP/UDP port. Keeping the pop up window that contains the "disconnect" button can be used. The user can go back to the Web server A's welcome page and find the button and other connection information again.

p. The user can be disconnected explicitly or implicitly. The explicit disconnection is done by sending an HTTP request containing a disconnect instruction, the session ID, the nonce N to Web server A over SSL (the nonce is only known by the user, Web server B that works with the server in the free zone, and Web server A; it is used to prevent denial-of-service attack, i.e., no other party can disconnect the user). It can be done by the user (click on the "disconnect" button in the pop up window or go back to Web server A's welcome page and click on a "disconnect" button there) or by a system administrator of Web server B. The implicit disconnection happens when the access controller A has not detected any traffic to/from the user for a time interval specified by the user or by the contract.

During the embodied methods, the user can be authenticated prior to connecting to the at least one server in the free zone using a web-based method. An example of the web-based method is described in steps (i) through (n).

Other authentication algorithms and other authentication protocols can be used to replace what has been exampled above. The authentication algorithms can meet the following conditions: (1) the server in the free zone is authenticated to the user before the user submits the authentication credential; (2) the user submits the authentication credential to the server in an encrypted channel; (3) the server validates the authentication credential; and (4) the server delivers the authentication result to the access controller A directly or indirectly in an encrypted channel with mutual authentication.

The example method described above highlights a number of advantages of the present embodiments: (1) the embodied methods do not require the user to pre-install any software, provided that the user has a Web browser; and (2) the embodied methods can be implemented by developing some CGI programs running with Web server A and B to interact with existing network devices such as Radius server A, B, and the programmable access controller A.

The ISP's access controller can be adapted to carry out the zone organizer user authentication and access control functions. In this embodiment, a secure connection between the ISP and the zone organizer is not needed if the ISP is handling the authentication protocols.

The embodied methods can be practiced by installing a special client on a user's laptop or PDA. If a special client is installed on the user's equipment, the client is responsible for authenticating the user to the hotspot Wi-Fi service provider for a qualified server paid service and regulating user's traffic to only flow to the paid servers.

The present embodiments can be used with any hotspot Wi-Fi service provider to integrate with an existing hotspot Wi-Fi network in order to bring in more revenue.

The present embodiments can be used by Web hosting service providers and global VPN service providers to offer free zone services to the employees of its customers.

The present embodiments require less maintenance and technical service to be offered by an ISP because special client does not have to be installed on a user's equipment thus saving money.

The zone organizer can track usage and issue points to the website or server owners. The points can be used similar to the frequent flyer mileage systems, wherein the points can be redeemed by the website owners for benefits from the ISP or other suppliers. This loyalty or points program can be used to encourage a website or server to keep using an ISP with a zone manager.

The zone organizer can keep a fee for the services provided for managing the zones from the ISP, or collect a fee from the website or server owners.

While these embodiments have been described with emphasis on the embodiments, it should be understood that within the scope of the appended claims, the embodiments might be practiced other than as specifically described herein.

What is claimed is:

1. A method of operating an access point, comprising:

receiving a first request from a device associated with a user to access a first web server operated by a first entity that has agreed with a second entity operating the access point to incur costs associated with a connection to a network provided by the access point;

sending a response to the device associated with the user including an address of an authentication program running on a secure port of a second web server different from the first web server, wherein the response causes the device associated with the user to securely communicate with the secure port for a period of time sufficient for the device associated with the user to attempt to be authenticated via the authentication program, wherein the second web server provides a one-time encryption key to the device associated with the user via the secure port such that the second entity associated with the access point is unable to access the one-time encryption key;

receiving an acknowledgment indicative of a result of the attempt to be authenticated via the authentication program; and when the received acknowledgement indicates that the device associated with the user is authentic, operating an access controller of the access point to route traffic to and from the device associated with the user based on an access control profile associated with the first web server.

2. A method as defined in claim 1, further including receiving a plurality of allowed network addresses with the acknowledgement.

3. A method as defined in claim 2, wherein the operating of the access controller includes restricting the device associated with the user to the plurality of allowed network addresses.

4. A method as defined in claim 1, further including tracking a usage statistic corresponding to communications between the device associated with the user and the first web server.

5. A method as defined in claim 4, further including billing the first entity according to the usage statistic.

6. A method as defined in claim 1, wherein the access control profile includes at least one of an Internet protocol address range, an allowed packet type, an allowed access time, an allowed bandwidth range, and a maximum number of sessions.

7. A non-transitory computer readable medium comprising instructions stored thereon that, when executed, cause a machine to at least:

receive a first request from a device associated with a user to access a first web server operated by a first entity that has agreed with a second entity operating an access point to incur costs associated with a connection to a network provided by the access point;

send a response to the device associated with the user including an address of an authentication program running on a secure port of a second web server, wherein the response causes the device associated with the user to securely communicate with the secure port to attempt to be authenticated via the authentication program, wherein the second web server provides a one-time encryption key to the device associated with the user via the secure port such that the second entity associated with the access point is unable to access the one-time encryption key;

receive an acknowledgment indicative of a result of the attempt to be authenticated via the authentication program; and when the received acknowledgement indicates that the device associated with the user is authentic, operate an access controller of the access point to route traffic to and from the device associated with the user based on an access control profile associated with the first web server.

8. A non-transitory computer readable medium as defined in claim 7, wherein the instructions further cause the machine to receive a plurality of allowed network addresses with the acknowledgement.

9. A non-transitory computer readable medium as defined in claim 8, wherein the instructions further cause the machine to operate the access controller by restricting the device associated with the user to the plurality of allowed network addresses.

10. A non-transitory computer readable medium as defined in claim 7, wherein the instructions further cause the machine to track a usage statistic corresponding to communications between the device associated with the user and the first web server.

11. A non-transitory computer readable medium as defined in claim 10, wherein the instructions further cause the machine to bill the first entity according to the usage statistic.

12. A non-transitory computer readable medium as defined in claim 7, wherein the access control profile includes at least one of an Internet protocol address range, an allowed packet type, an allowed access time, an allowed bandwidth range, and a maximum number of sessions.

13. An apparatus having an access point, comprising:

a communication interface to receive a first request from a device associated with a user, the first request being to access a first web server operated by a first entity that has agreed with a second entity operating the access point to incur costs associated with a connection to a network provided by the access point, the communication interface to send a response to the device associated with the user including an address of an authentication program running on a secure port of a second web server, wherein the response causes the device associated with the user to securely communicate with the secure port to attempt to be authenticated via the authentication program, wherein the second web server provides a one-time encryption key to the device associated with the user via the secure port such that the second entity associated with the access point is unable to access the one-time encryption key, the communication interface to receive an acknowledgment indicative of a result of the attempt to be authenticated via the authentication program; and an access controller to, when the received acknowledgement indicates that the device associated with the user is authentic, route traffic to and from the device associated with the user based on an access control profile associated with the first web server, the access controller implemented by a processor.

14. An apparatus as defined in claim 13, wherein the communication interface is to receive a plurality of allowed network addresses with the acknowledgement.

15. An apparatus as defined in claim 14, wherein the access controller is to restrict the device associated with the user to the plurality of allowed network addresses.

16. An apparatus as defined in claim 13, wherein the access controller is to track a usage statistic corresponding to communications between the device associated with the user and the first web server.

17. An apparatus as defined in claim 16, wherein the access controller is to facilitate billing the first entity according to the usage statistic.

18. An apparatus as defined in claim 13, wherein the access control profile includes at least one of an Internet protocol address range, an allowed packet type, an allowed access time, an allowed bandwidth range, and a maximum number of sessions.

* * * * *